United States Patent
Liu et al.

(10) Patent No.: US 8,472,475 B2
(45) Date of Patent: Jun. 25, 2013

(54) SYSTEM AND METHOD FOR RETRANSMISSION AND FRAGMENTATION IN A COMMUNICATION NETWORK

(75) Inventors: Changwen Liu, San Diego, CA (US); Ronald B. Lee, San Diego, CA (US)

(73) Assignee: Entropic Communications, Inc., San Diego, CA (US)

( * ) Notice: Subject to any disclaimer, the term of this patent is extended or adjusted under 35 U.S.C. 154(b) by 400 days.

(21) Appl. No.: 12/687,772

(22) Filed: Jan. 14, 2010

(65) Prior Publication Data
US 2010/0180171 A1    Jul. 15, 2010

Related U.S. Application Data

(60) Provisional application No. 61/144,627, filed on Jan. 14, 2009, provisional application No. 61/144,603, filed on Jan. 14, 2009.

(51) Int. Cl.
*H04J 3/24* (2006.01)

(52) U.S. Cl.
USPC ........... 370/474; 370/389; 370/236; 370/252; 370/390; 370/394; 714/748; 714/749; 714/751

(58) Field of Classification Search
USPC ................. 370/474, 389, 390, 473, 252, 334, 370/328, 338; 714/748, 749, 751
See application file for complete search history.

(56) References Cited

U.S. PATENT DOCUMENTS

| | | | | |
|---|---|---|---|---|
| 4,703,475 A * | 10/1987 | Dretzka et al. | | 370/394 |
| 7,701,975 B1 * | 4/2010 | Tsang et al. | | 370/474 |
| 7,733,914 B2 * | 6/2010 | Baker et al. | | 370/474 |
| 2005/0111416 A1 * | 5/2005 | Ginzburg | | 370/338 |
| 2005/0238054 A1 * | 10/2005 | Sharma | | 370/473 |
| 2006/0018315 A1 * | 1/2006 | Baratakke et al. | | 370/389 |
| 2006/0072615 A1 * | 4/2006 | Narad et al. | | 370/474 |
| 2007/0101020 A1 * | 5/2007 | Lin et al. | | 709/238 |
| 2008/0084883 A1 * | 4/2008 | Sun et al. | | 370/392 |
| 2008/0130561 A1 * | 6/2008 | Shao et al. | | 370/329 |
| 2008/0130617 A1 * | 6/2008 | Singh et al. | | 370/345 |

OTHER PUBLICATIONS

A.S. Tannenbaum: "Computer Networks, 3rd edition." 1996, Prentice-Hall, US, XP002572908, pp. 175-241, paragraph [03.4].

* cited by examiner

*Primary Examiner* — Ricky Ngo
*Assistant Examiner* — Rasheed Gidado
(74) *Attorney, Agent, or Firm* — Bruce Greenhaus; Richard Bachand; Sheppard Mullin Richter & Hampton LLP

(57) ABSTRACT

A system and method for fragmented transmission and retransmission in a communication network. According to various embodiments of the disclosed method and apparatus, a method for fragmenting a protocol data unit for transmission from a source node in a communication network includes the operations of determining a plurality of subpackets in which to send the protocol data unit having one or more service data units; creating a data unit header for a first of the plurality of subpackets; identifying one or more fragments for inclusion in the first of the plurality of subpackets; creating an aggregation subheader for the first of the plurality of subpackets, wherein the aggregation subheader comprises data identifying the one or more fragments; and concatenating the data unit header, one or more fragments and aggregation subheader to build the first of the plurality of subpackets.

28 Claims, 10 Drawing Sheets

SYSTEM AND METHOD FOR RETRANSMISSION AND FRAGMENTATION IN A COMMUNICATION NETWORK

CROSS-REFERENCE TO RELATED APPLICATIONS

This application claims the benefit of U.S. Provisional Application Nos. 61/144,627, and 61/144,603, both of which were filed Jan. 14, 2009, and both of which are herein incorporated by reference in their entirety.

TECHNICAL FIELD

The presently disclosed method and apparatus relates generally to communication networks, and more particularly, some embodiments relate to fragmentation or retransmission of packets in a communication network.

DESCRIPTION OF THE RELATED ART

A home network may include multiple types of subscriber equipment configured to deliver subscriber services throughout the home. These subscriber services include delivering multimedia content, such as streaming audio and video, through the home network to subscriber equipment, where it is presented to a user. As the number of available subscriber services has increased and they become more popular, the number of devices being connected within each home network has also increased. The increase in the number of services and devices increases the complexity of coordinating communication between the network nodes.

With an increase in the number and variety of devices on the network, bandwidth has tended to become a more important consideration. To compound matters, some networks, such as the MoCA (Multimedia over Coax Alliance) network, for example, data packets are transmitted in the format of aggregates. There are two potential issues with the aggregate transmissions. First, interference can corrupt a frame in transmission and cause the loss of some of the data packets in an aggregate frame permanently. Thus, the presence of any interference, for example, a Global System for Mobile Communication (GSM) cell phone near a MoCA node, may degrade network performance below its specification.

Second, in some networks such as MoCA, a MAP cycle is used. MAP stands for the Media Access Plan, which is used to convey information about upcoming transmissions on the medium (including the MAP transmission time) for the duration specified in the MAP. From time to time a MAP cycle needs to accommodate inflexible transmissions such as MAP, Beacon, and Admission Control Frame (ACF) elements that can be transmitted only at specific time slots of a MAP cycle. As such, the transmission time for these cannot be altered by the MAP that specifies their transmission time. For example, a common operation mode for robust MAP recovery is that MAP is transmitted at a constant period as illustrated in FIG. 1. As seen in FIG. 1, each MAP 22 in a MAP cycle 20 is transmitted with a constant period of MAP_TX_TIME_GAP 23. As a result, the transmission interval of the next MAP starts at the fixed time offset from the current MAP starting time. The MAP cannot be shifted left or right to accommodate other transmissions. Likewise, FIG. 1 also shows a fixed Beacon transmission interval and the accompanied ACF slots. In FIG. 1, the Beacon 30 and ACF 32 are transmitted at specific timeslots.

Other transmissions of a MAP cycle, including data transmissions, must be scheduled as atomic entities at the rest of the MAP cycle. In particular, they cannot overlap with any of these fixed transmission intervals. There is also very limited flexibility of MAP cycle length—it is a value with minor deviation from a fixed value. As a result, time intervals around these inflexible transmissions cannot be scheduled for transmissions due to schedule difficulties. These are then left as no-transmission slots 34 (or idling slots) as shown at the bottom of FIG. 1. The MAP and the Beacon in the MAP cycle must be transmitted at fixed time interval. Other transmissions as atomic tasks cannot be scheduled and as a result, there are three 'holes', i.e. no-transmission intervals left in the rest of the cycle. The bandwidth is often wasted when scheduling these fixed transmissions and other transmissions which are all atomic.

BRIEF SUMMARY

According to various embodiments of the disclosed method and apparatus, nodes on a network (also referred to as network devices) are programmed to fragment communications to facilitate fragmented transmission and retransmission of data units in a communication network. According to various embodiments of the disclosed method and apparatus, a method for fragmenting a protocol data unit for transmission from a source node in a communication network includes the operations of determining a plurality of subpackets in which to send the protocol data unit having one or more service data units; creating a data unit header for a first of the plurality of subpackets; identifying one or more fragments for inclusion in the first of the plurality of subpackets; creating an aggregation subheader for the first of the plurality of subpackets, wherein the aggregation subheader comprises data identifying the one or more fragments; and concatenating the data unit header, one or more fragments and aggregation subheader to build the first of the plurality of subpackets. In various embodiments, the source node repeats the above operations for remaining subpackets of the plurality of subpackets.

In one embodiment, the one or more fragments each comprise a service data unit or a portion of a service data unit, and the aggregation subheader further comprises data identifying a length of each of the one or more fragments. Additionally, in various embodiments, the source node computes a checksum for each of the fragments in the first of the plurality of subpackets, and concatenates the checksum for each fragment with its respective fragment in the first of the plurality of subpackets. In further embodiments, the source node is configured to pad one or more fragments in the first of the plurality of subpackets.

In yet further embodiments, a method for enabling retransmission of packet data units in a communication network that supports fragmentation of packet data units, the method includes: a network node receiving a plurality of subpackets, wherein each subpacket comprises a packet data unit header, a subpacket header, and one or more fragments; the network node checking flow information for the one or more fragments received in the plurality of subpackets and determining whether one or more packets in an original packet data unit have been received in their entirety from a sending node; and the network node requesting retransmission of the original packet data unit if the network node determines that at least one of the one or more fragments is missing from a flow in the original packet data unit. In one application, the operation of checking flow information for the fragments received comprises checking sequence numbers of the fragments to determine whether each fragment in a sequence of fragments is received. In one embodiment, a subpacket of the plurality of subpackets comprises an MPDU, an A-PDU or a sub-MPDU.

In one embodiment, the network node uses the flow information packaged into a subheader to reassemble a plurality of fragments in subpackets into a service data unit. The flow information includes in some implementations a fragment number, a fragment length and a sequence number for the plurality of fragments received.

Other features and aspects of the disclosed method and apparatus will become apparent from the following detailed description, taken in conjunction with the accompanying drawings, which illustrate, by way of example, the features in accordance with embodiments of the disclosed method and apparatus. The summary is not intended to limit the scope of the claimed invention, which is defined solely by the claims attached hereto.

BRIEF DESCRIPTION OF THE DRAWINGS

The disclosed method and apparatus, in accordance with one or more various embodiments, is described in detail with reference to the following figures. The drawings are provided for purposes of illustration only and merely depict either typical embodiments or examples of particular embodiments. These drawings are provided to facilitate the reader's understanding of the disclosed method and apparatus and shall not be considered limiting of the breadth, scope, or applicability of the claimed invention. It should be noted that for clarity and ease of illustration these drawings are not necessarily made to scale.

The figures are not intended to be exhaustive or to limit the claimed invention to the precise form disclosed. It should be understood that the disclosed method and apparatus can be practiced with modification and alteration, and that the claimed invention should be limited only by the claims and the equivalents thereof.

DETAILED DESCRIPTION

Figure 1:
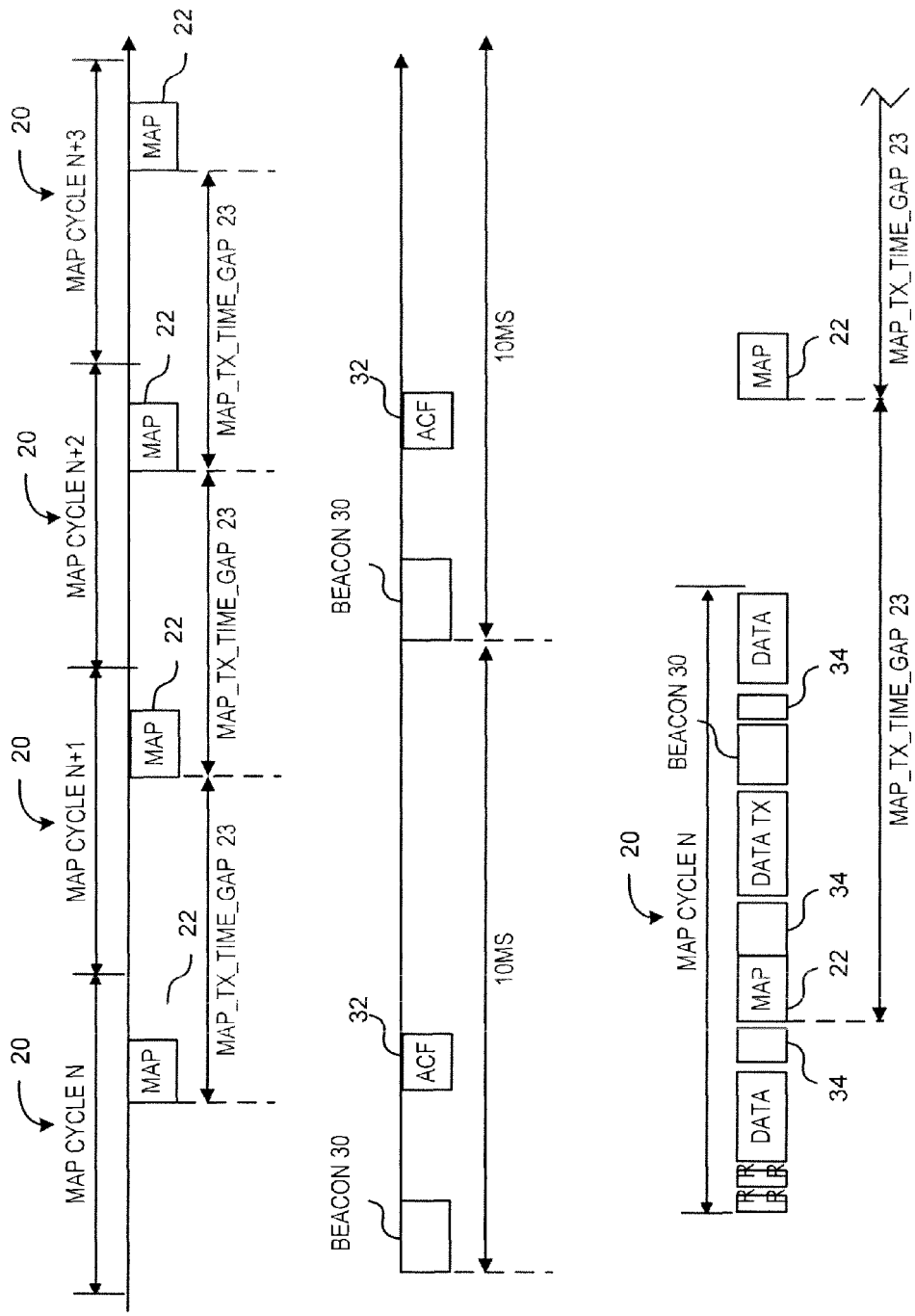
FIG. 1 illustrates an example of fixed MAP intervals, fixed beacon intervals, ACF slots and no-transmission slots.
Figure 2:
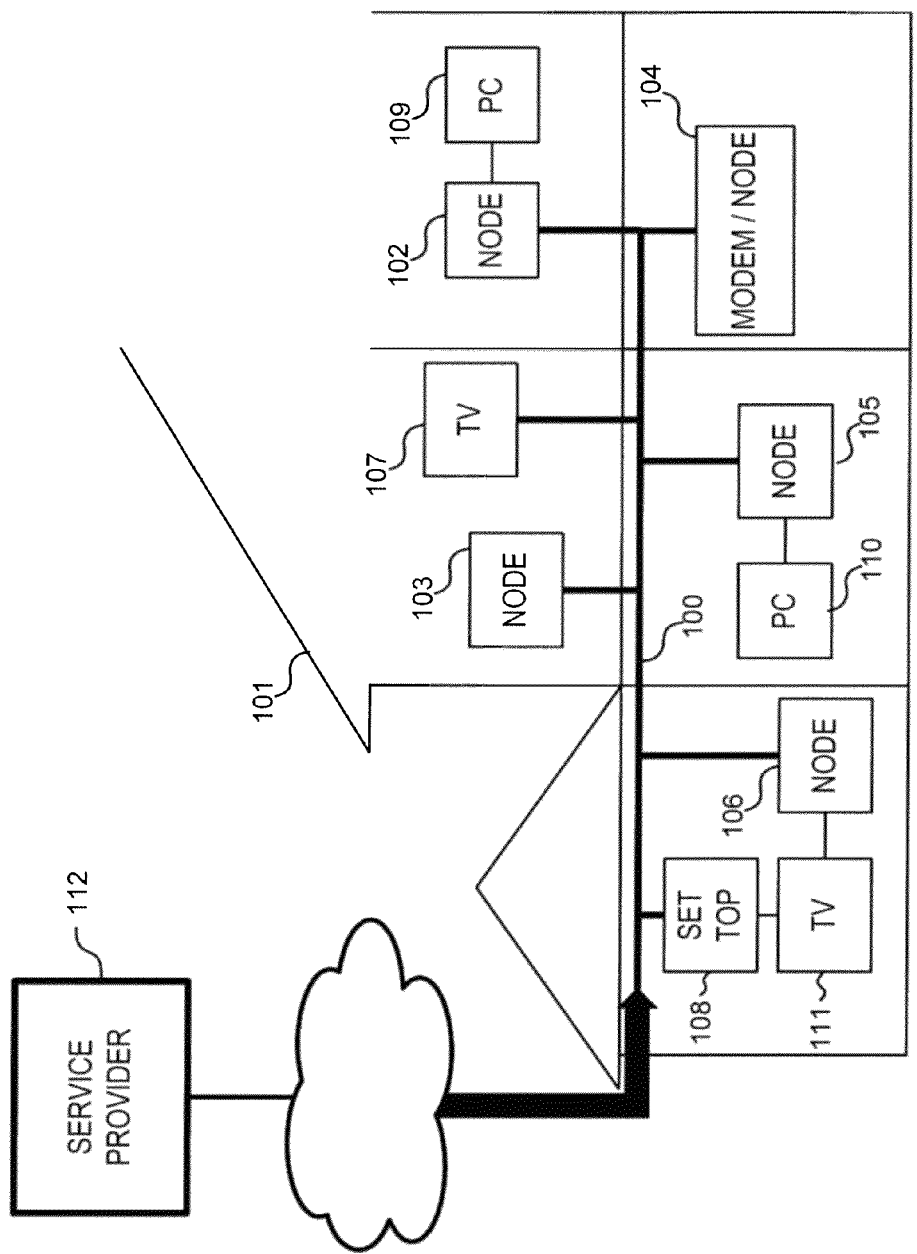
FIG. 2 illustrates an example of one environment in which some embodiments of the disclosed method and apparatus may be implemented.

Before describing the disclosed method and apparatus in detail, it is useful to describe an example of an environment in which the disclosed method and apparatus can be implemented. The network of FIG. 1 will be described for this purpose. A wired communications medium 100 is shown. In some embodiments, the wired communications medium might be a coaxial cable system, a power line system, a fiber optic cable system, an Ethernet cable system, or other similar communications medium. Alternatively, the communications medium might be a wireless transmission system. In the illustrated embodiment, the communications medium 100 is preinstalled coaxial cabling deployed within a residence 101.

The network comprises a plurality of network nodes 102, 103, 104, 105, 106 in communication according to a communications protocol. For example, the communications protocol might comprise a networking standard, such as the Multimedia over Coax Alliance (MoCA) standard. In the illustrated embodiment, the communications protocol specifies a packet based communications system. In this embodiment, physical layer (PHY) packets comprise preambles and payloads. A PHY preamble is typically inserted at the beginning of each packet to assist receivers in detecting and acquiring the physical layer parameters to properly decode the packet. The communications protocol may have a plurality of pre-defined PHY preambles to use with different types of network communications. For example, one type of preamble may be used when transmitting in a diversity mode (a communication mode in which little is known about the communication channel). Another type of preamble may be used when transmitting a media access plan (MAP) message. Other types of packets may use other types of preambles.

A PHY payload is used to transmit the data content of the packet. In some cases, the PHY payload has a predetermined format. For example, in a MoCA network, network maintenance messages and MAP messages each have a format that is determined by the MoCA protocol. In other cases, the PHY payload may have undetermined format. For example, the PHY payload of a media streaming transmission might comprise an embedded Ethernet packet or a portion thereof.

In some embodiments, activity on the network is controlled by a Network Coordinator (NC) node (also sometimes referred to as the "Network Controller"). In one such embodiment, one of the nodes is selected to perform the functions of the NC based upon a process defined by the communications protocol. In networks employing an NC, the NC schedules network communications between network nodes using a MAP. The MAP is sent as a packet. Such MAP packets are sent on a regular basis. MAPs are generated in response to reservation requests by the nodes of the network. The NC also performs admission procedures when a new node requests admission to the network.

Nodes described herein can be associated with a variety of devices. For example, in a system deployed in a residence 101, a node may be a network communications module associated with one of the computers 109 or 110. Such nodes allow the computers 109, 110 to communicate on the communications medium 100. Alternatively, a node may be a module associated with a television 111 to allow the television to receive and display media streamed from one or more other network nodes. A node might also be associated with a speaker or other media playing devices 103 that plays music.

A node might also be associated with a module configured to interface with an internet or cable service provider 112, for example to provide Internet access, digital video recording capabilities, media streaming functions, or network management services to the residence 101.

According to one embodiment, an aggregate format for a packet data unit is provided to enable fragmentation and selective retransmission. In one embodiment, a network control node fragments data aggregates around the fixed transmission intervals. More particularly, in one embodiment, a new format of aggregation is defined that includes multiple Ethernet frames and supports fragmentation.

Figure 3:
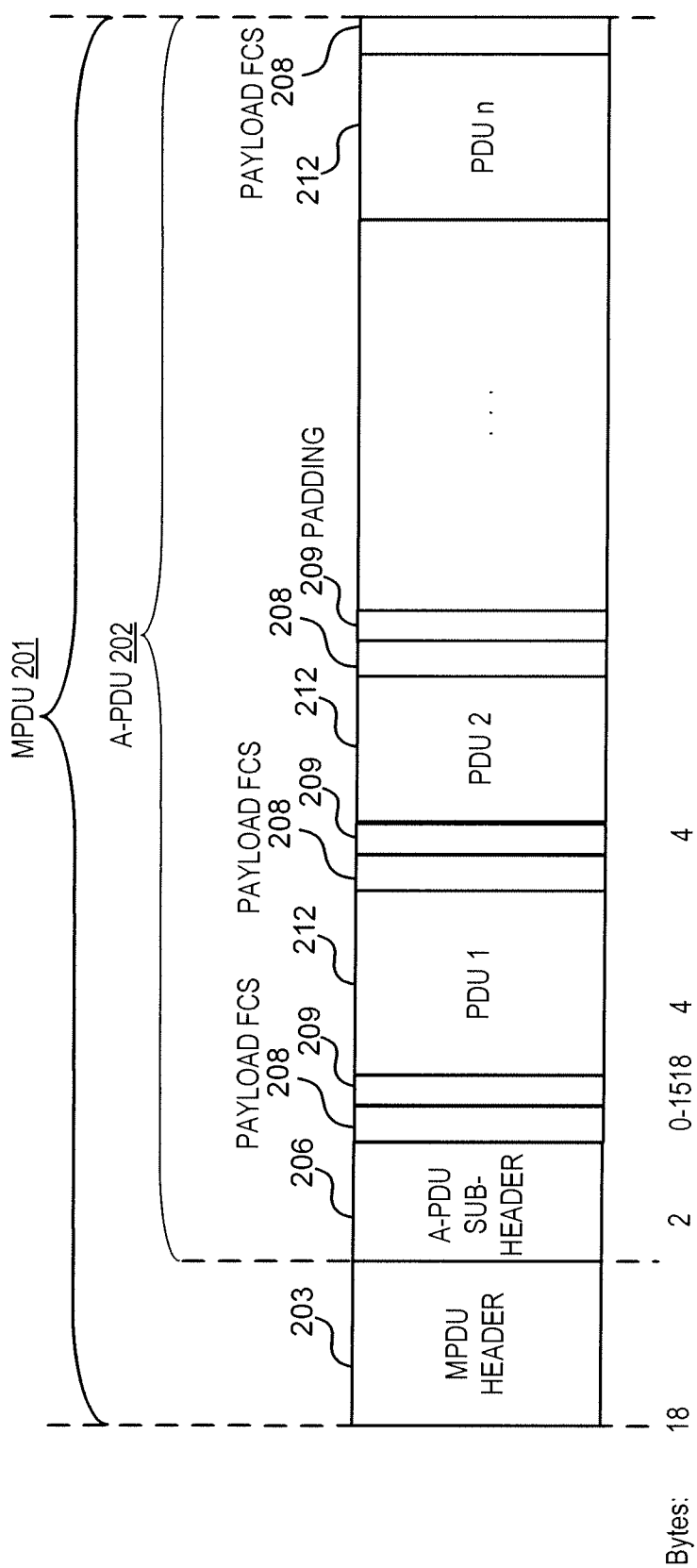
FIG. 3 is a diagram illustrating an example aggregate packet in accordance with one embodiment of the systems and methods described herein.

FIG. 3 is a diagram illustrating an example aggregate packet in accordance with one embodiment of the systems and methods described herein. The example illustrated in FIG. 3 is presented in terms of a packet for use with a MoCA network. Referring now to FIG. 3, the example illustrates a packet, MPDU 201, that includes a packet header 203 and a sub-packet, Aggregate Data Packet Unit (A-PDU) 202.

In one embodiment, A-PDU subpacket 202 is a service data unit made up of multiple protocol data units (PDUs) 212, a sub-header 206 Frame Check Sequence (FCS) 208, and padding 209. One example of an A-PDU sub-header 206 is outlined in Table 1.

In this example, the subheader 206 includes, among other fields, fields indicating the length of each protocol data unit length (PDU_LEN), the sequence number of each protocol unit (PDU_SEQ), the fragment number of the requested aggregated protocol data unit (A_PDU_FRAG_NUM), the fragment number of the first PDU (FIRST_PDU_FRAG_NUM), and an indicator as to whether the last PDU is the last fragment of a MAC service data unit MSDU (LAST_FRAGMENT_INDICATOR_FOR_THE_LAST_PDU). The data unit length is the size in bytes of protocol data unit at $i^{th}$ position in the aggregated packet 201. In one embodiment, this includes the FCS but excludes any padding 209 at the end of the packet unit. Any frame check can be used such as a polynomial code checksum or other hash function to detect changes to the data. An example of a frame check sequence is a cyclic redundancy check, or CRC, or an FCS.

In this example, the sequence number (PDU_SEQ) is the sequence number of a protocol data unit at the $i^{th}$ position in the aggregated packet. In one embodiment, to facilitate tracking, the protocol data unit fragments of a complete MSDU have the same sequence number. The sequence number of a MSDU can be assigned by the transmitter MAC layer per flow, which is uniquely defined by its flow control ID (FCID), when the data unit is received at MAC SAP from upper layer.

TABLE 1 A-PDU Sub-Header Format

| Parameter Name | Length | Description |
| --- | --- | --- |
| SSN | 16 bits | Starting Sequence Number at transmitter buffer. |
| DESTINATION_FLOW_ID | 8 bits | For unicast Parameterized Quality of Service (PQoS)flows, this is the Destination Flow ID of the flow if the Destination Flow ID is assigned; otherwise this is the same as the Destination Node ID field of the MoCA header. For multicast and broadcast flows, this is the same as the Destination Node ID field of the MoCA header. |
| RESERVED | 5 bits | Type III |
| A_PDU_FRAG_NUM | 3 bits | Fragment number of this A-PDU per REQUEST_ID. Starts at value 0, increments by 1 for each fragment. |
| NPDU | 8 bits | Number of PDUs in A-PDU. The maximal allowed NPDU is $N_a - 1$. |
| LAST_FRAGMENT_INDICATOR_FOR_THE_FIRST_PDU | 1 bit | Indicates whether the first PDU is the last fragment of an MAC service data unit (MSDU). 1 - The first PDU is the last fragment of an MSDU. 0 - The first PDU is not the last fragment of an MSDU. |
| FIRST_PDU_FRAG_NUM | 3 bits | The fragment number of the first PDU in this aggregate. This field is a 3-bit field indicating the number of each fragment of an MSDU. The fragment number is set to 0 in the first fragment of an MSDU or for a non-fragmented MSDU, and is incremented by one for each successive fragment of that MSDU. |
| LAST_FRAGMENT_INDICATOR_FOR_THE_LAST_PDU | 1 bit | Indicate whether the last PDU is the last fragment of an MSDU. 1 - The last PDU is the last fragment of an MSDU. 0 - The last PDU is not the last fragment of an MSDU |
| LAST_PDU_FRAG_NUM | 3 bits | The fragment number of the last PDU in this aggregate. |
| For (i=0; i<NPDU; i++) { | | |
| PDU_LEN | 16 bits | Size in bytes of a PDU data at $i^{th}$ position in this aggregated packet including the FCS but not including any padding bytes at the end of the PDU; |
| PDU_SEQ | 16 bits | The sequence number of a PDU at $i^{th}$ position in this aggregated packet. The PDU fragments of a complete MSDU have the same sequence number which is uniquely assigned by transmitter MAC layer per flow at MAC SAP. The sequence number is strictly increasing with increment 1. The sequence number cycles back to 0 after it reaches the value 65535. |
| } | | |
| A_PDU_HEADER_FCS | 16 bits | FCS of the entire aggregate subheader only, assuming this field is 0x0000. |

In one embodiment, the sequence number is increased in increments of 1 for each subsequent packet unit fragment. In another embodiment, the sequence number cycles back to 0 after it reaches the value 65535.

The fragment number of an A_PDU in this example is a 3-bit field indicating the number of each fragment of the whole requested A_PDU. The fragment number is set to 0 in the first or only fragment of an A_PDU and is incremented by one for each successive fragment of that A_PDU.

Likewise, because fragmenting can also be done for MSDUs, in another embodiment, the fragment number of a MSDU in this example is a 3-bit field indicating the number of each fragment of the whole requested MSDU. The fragment number is set to 0 in the first or only fragment of an MSDU and is incremented by one for each successive fragment of that MSDU.

With continued reference to the example of FIG. 3, each protocol data unit 212 is either the entire MSDU, or a fragment thereof. For example, in a MoCA environment, each PDU 212, is either the entire MSDU, or a fragment of an MSDU. The PDUs 212 in the A-PDU 202 are separated by a 4 byte Payload CRC 208 calculated for the preceding PDU 212. Also in this example, each of the PDUs 212, except the last one, is padded. In one embodiment, the padding is added so that the preceding PDU 212 plus the payload CRC 208 plus the padding is a multiple of 4 bytes. All PDUs 212 in an A-PDU have the same FCID. In one embodiment, FCID is completely defined by the three tupple: the Source node ID, the priority of its data, and the Destination node ID. In some embodiments, the FCID includes a fourth element—the Destination Flow (DFID). In one embodiment, this is the DA field value of the Ethernet data frame.

Figure 4:
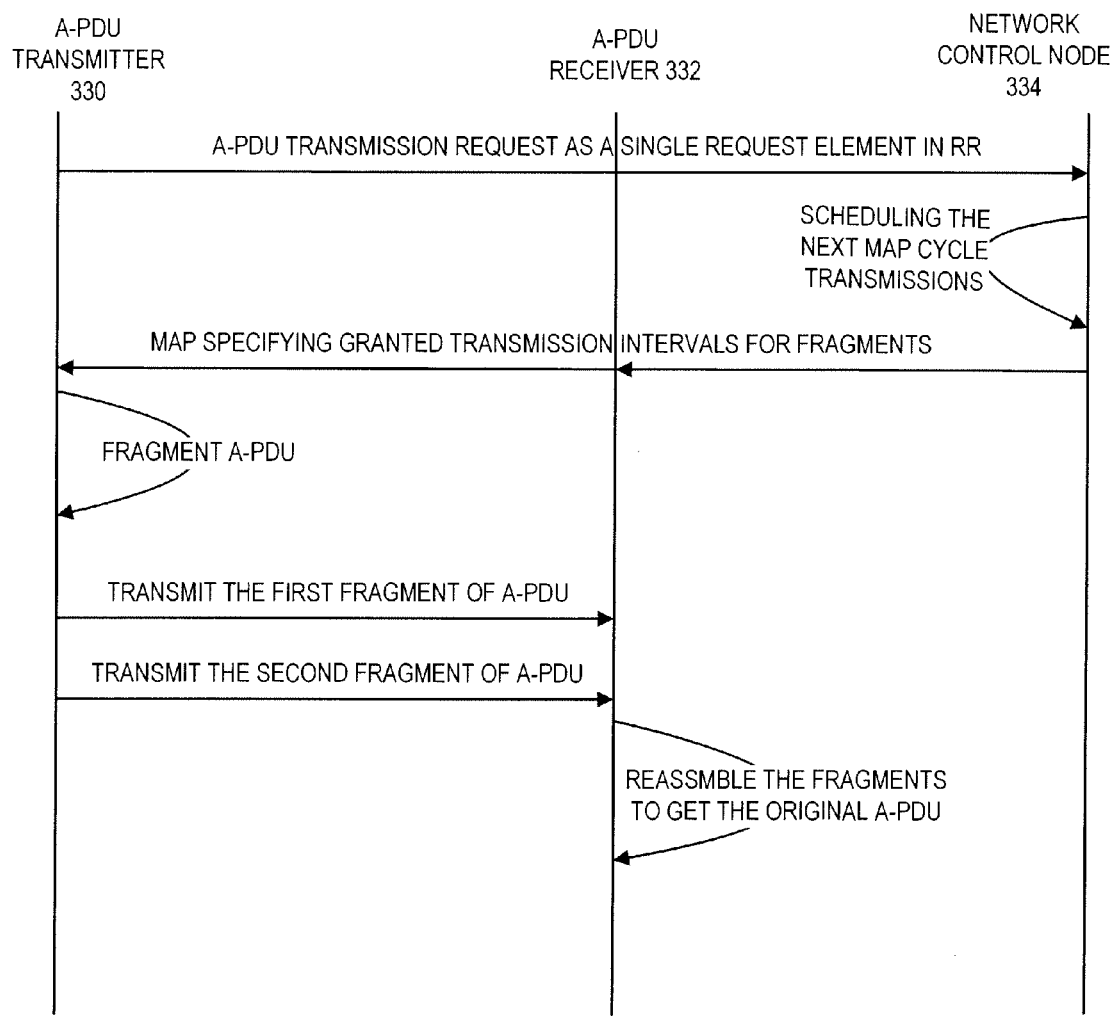
FIG. 4 is a diagram illustrating an example fragmentation procedure in accordance with one embodiment of the systems and methods described herein.

In one embodiment, the fragmentation decision for an A-PDU is done by the network control node after a client submits a transmission request (as a request element in reservation request) to the network control node for the A-PDU. FIG. 4 is a diagram illustrating an example fragmentation procedure in accordance with one embodiment of the systems and methods described herein. In this example, the network control node 334 receives reservation requests from client nodes such as a sending node 330 (or transmitter) and a receiving node 332 (or receiver). The network control node 334 then fragments granted transmission requests for A-PDUs around these inflexible transmission intervals. The network control node communicates back fragmentation decisions via transmission grants as allocation units in its next MAP. Due to very limited flexibility of MAP cycle length, an A-PDU can also be fragmented around the reservation requests, which are always the first transmissions of a MAP cycle, across two MAP cycles. Upon notification from the network control node in MAPs, the client fragments one A-PDU into two or more A-PDUs and transmit them in two or more time intervals as specified in the next and/or latter MAPs. The receiver 332 reassembles the received fragments. With this fragmentation scheme, the no-transmission holes of a MAP cycle can be filled and in some cases eliminated completely.

Figure 5:
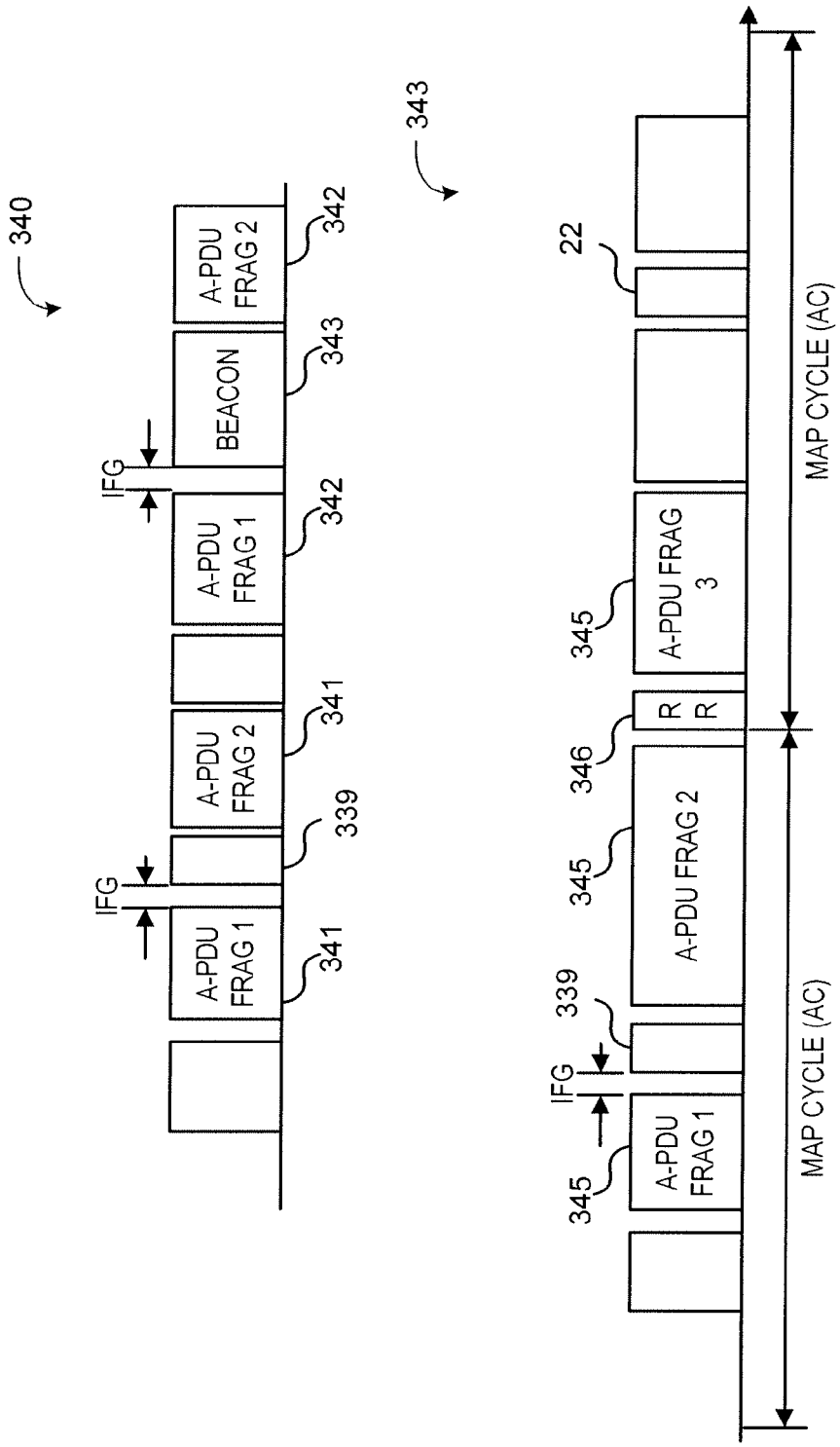
FIG. 5 illustrates an example of fragmentation in accordance with one embodiment of the systems and methods described herein.

FIG. 5 illustrates an example of fragmentation in accordance with one embodiment of the systems and methods described herein. The example at 340 illustrates an example in which one A-PDU is fragmented into two fragments 341 around the MAP 339, and another A-PDU is fragmented into two fragments 342 around a Beacon 343 within one MAP cycle. The example at 343 shows another example in which one A-PDU is fragmented into three fragments 345 around MAP 339 and reservation requests 346 of the next MAP cycle.

Figure 6:
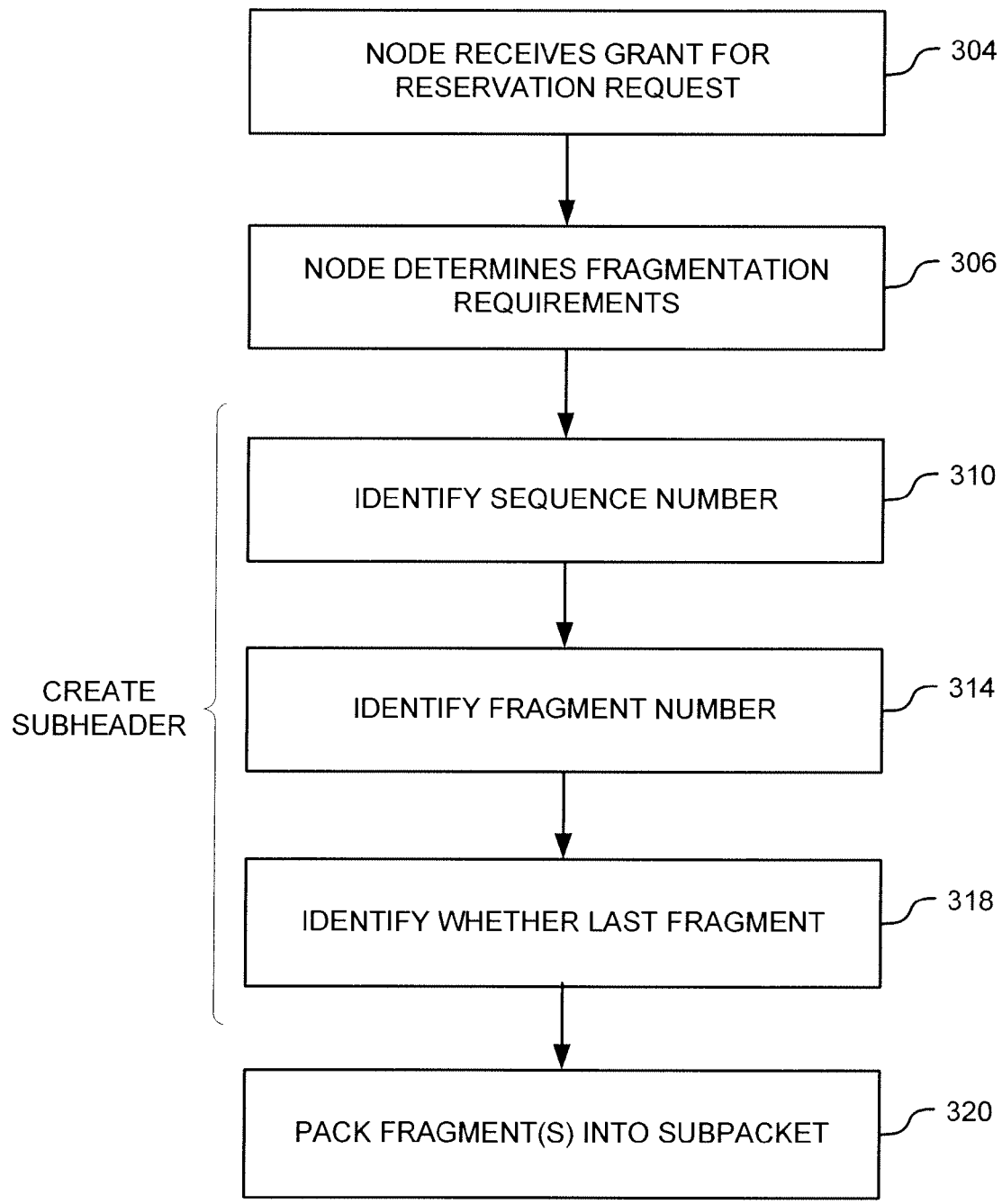
FIG. 6 is a diagram illustrating an example process for creating a Media Access Control layer (MAC) Protocol data unit, or MPDU, in accordance with one embodiment of the systems and methods described herein.
Figure 7:
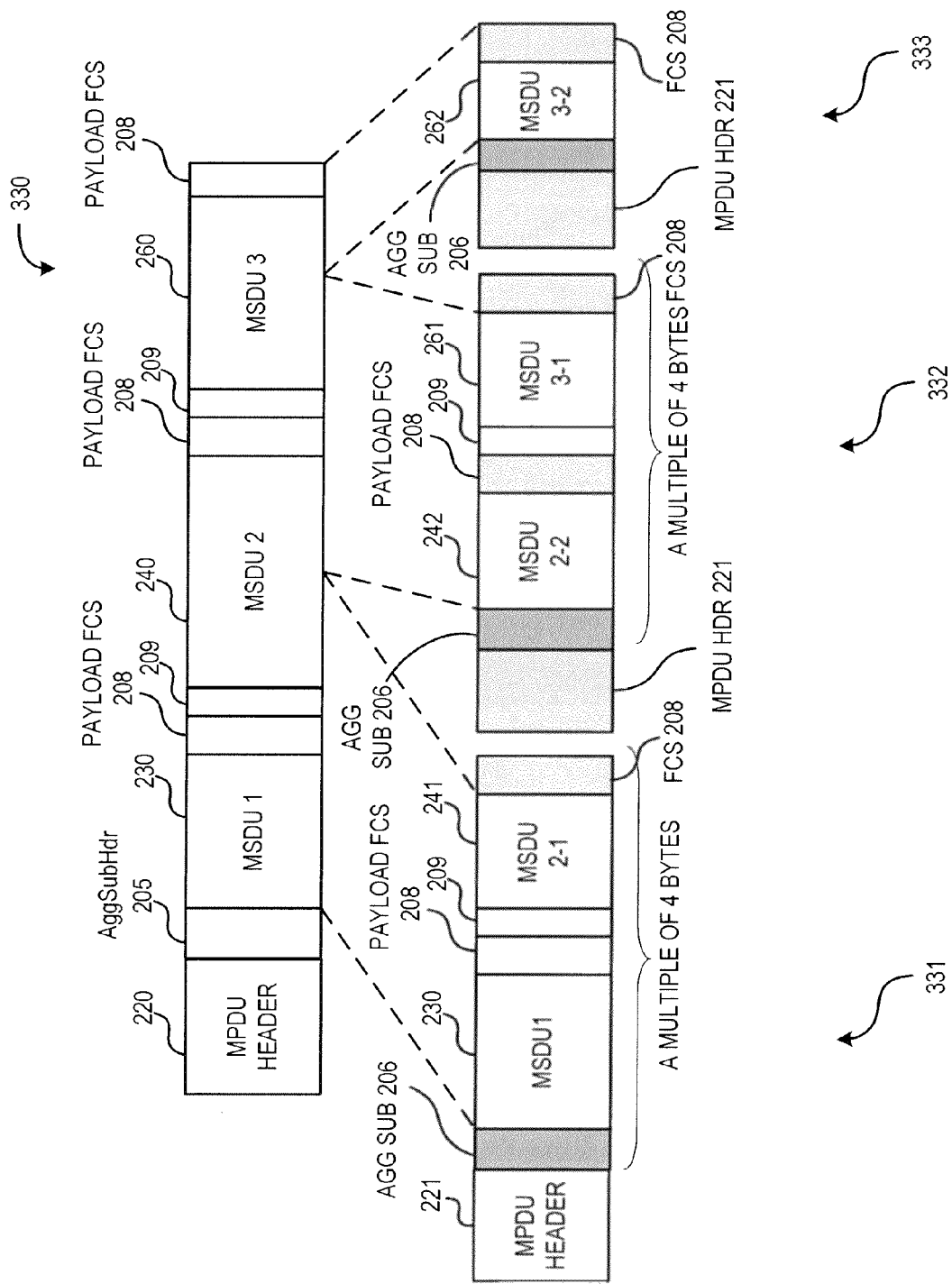
FIG. 7 is a diagram illustrating an example of Aggregate Data Packet Unit (A-PDU) and MAC service data unit (MSDU) fragmentation in accordance with one embodiment of the systems and methods described herein.

FIG. 6 is a diagram illustrating an example process for creating a MAC Protocol data unit, or MPDU, in accordance with one embodiment of the systems and methods described herein. In this example, at operation 304, a network node requests a time slot and receives a bandwidth grant for the network. The grant, for example, indicates a number of communication slots allocated to the node for network communications. At operation 306, the node examines its communication requirements and determines whether fragmentation is required to communicate the data in the allocated timeslots. If so, the node determines the fragmentation requirements and breaks the data unit (e.g., a MSDU) into fragments, or packet units (e.g., PDUs). In one embodiment, two nested levels of fragmentation are performed. These are fragmentation of the aggregate MPDU, and fragmentation of individual packets, or MSDUs in the aggregate MPDU. An example of this is shown in FIG. 7, in which an MPDU 330 is fragmented into MPDUs 331, 332, and 333. The example in FIG. 7 also shows the MSDUs 240 and 260 fragmented into fragments 241, 242, 261, and 262 within the MPDU 330. FIG. 7 is discussed in greater detail below.

With the fragmentation determined, the node creates a MPDU, and creates a subheader to identify the fragmentation to the receiver. In the example of FIG. 6, the node identifies the sequence number, fragment number and last-fragment flag for each PDU, and uses these as part of the entry in the subheader for each PDU. At operation 310 the node identifies the sequence number. In one embodiment, the sequence number is the sequence number of the PDU at the position in the aggregated packet. At operation 314 the node identifies the fragment number of the first PDU sent in the MPDU. The fragment number is the number of the fragment of the first PDU which is sent in the MPDU. At operation 318, the node identifies whether a fragment is the last fragment of its MSDU. At operation 320, the node builds the MPDUs that are to be used to carry the fragments.

FIG. 7 is a diagram illustrating an example of MPDU and MSDU fragmentation in accordance with one embodiment of the systems and methods described herein. In the illustrated example, a network node has three data units to send to one or more receiver nodes. For example, in terms of a MoCA embodiment, these can be three MAC service data units (MSDUs). If the network node is given a bandwidth allocation sufficient for it to transmit these three service data units without fragmentation, these can be packaged into a single data unit 330 as illustrated in FIG. 7. In particular, the data unit 330 includes a header 220, a subheader 205, and the three aforementioned service data units MSDU 1 230, MSDU 2 240, and MSDU 3 260. As illustrated in this example, each data unit has a cyclic redundancy check 208, and all but the last data unit includes padding 209.

In the illustrated example, it is assumed that the network node has not been allocated a sufficient amount of contiguous bandwidth to transmit the entire MPDU 330 across the network in one continuous stream. It is further assumed in this example that the network node must break up the data unit 330 into three MPDUs for transmission. Accordingly, the example in FIG. 6 illustrates three separate MPDUs used to transmit MPDUs 331, 332, 333 to transmit MSDU 1 230, MSDU 2 240, and MSDU 3 260. Each of these MPDUs 331, 332 333 includes its own header 221 as well as an aggregate subheader 206. In one embodiment, aggregate subheader 206 is in a format as described above with reference to Table 1.

In this example, data unit 230 is of a sufficiently small size that it can fit within the allocation provided for MPDU 331. Accordingly, in the illustrated example, data unit one 230 is illustrated as being packed into MPDU 331 in its entirety. As illustrated, data unit 230 includes the redundancy check 208 and padding 209. However, data unit 240 must be fragmented and the fragments sent in two separate MPDUs. Particularly, in the example of FIG. 6, data unit 240 is divided into a fragment 241 and a fragment 242. In this example, fragment 241 is placed in MPDU 331, and fragment 242 is placed in MPDU 332. Likewise, data unit 3 260 is divided into two fragments. These are fragments 261 and 262. Fragment 261 is placed in MPDU 332. Fragment 262 is placed in MPDU 333. Thus, as this example illustrates, the three data units 230, 240 and 260 are divided into five fragments 230, 241, 242, 261, 262 and sent in three MPDUs 331, 332, 333.

As noted above, each MPDU includes an aggregate subheader 206 that can be in the format illustrated above in Table 1. Accordingly, in one embodiment, subheader 206 includes information regarding a sequence number of its respective fragments, fragment lengths, fragment numbers, and whether or not a fragment is the last fragment of a protocol data unit.

In each fragmentation operation in this example, the source node creates an additional MPDU header. The source node also creates an aggregation sub-header, and a PDU FCS for the second fragment. The source node revises the packet length information and PDU information in the first fragment as appropriate. In one embodiment, the MPDU header is 18 bytes and the FCS size is 4 bytes. As the example of Table 1 illustrates, the aggregation sub-header of a fragment includes information on PDUs contained in the fragment. The overhead of an aggregation sub-header for an A-PDU fragment is 8 bytes of common fields plus 4 bytes of the information entry for the fragmented PDU. When a fragment of an MSDU is aggregated to one aggregate, the size increment of the aggregate is more than 8 bytes.

Figure 8:
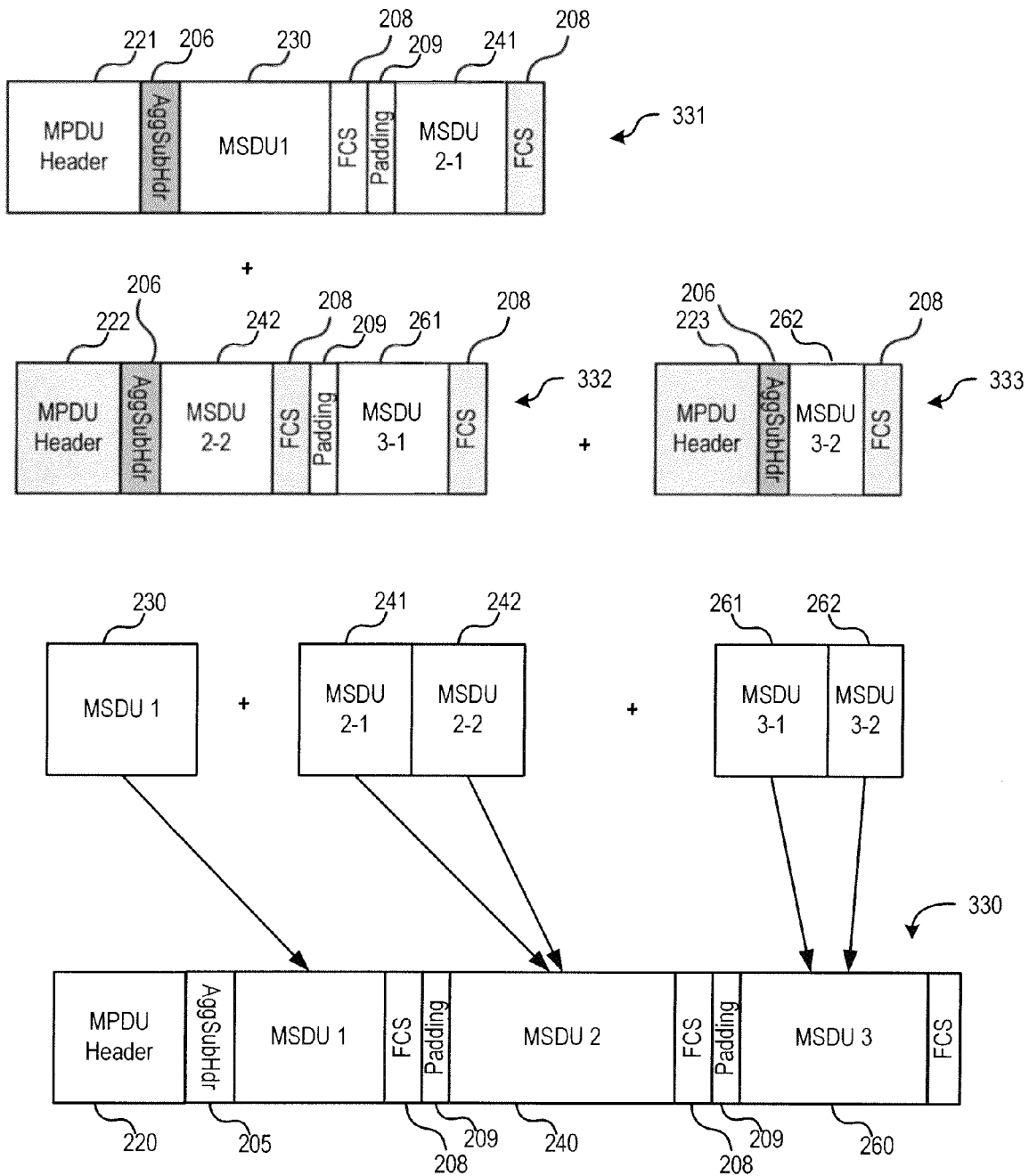
FIG. 8 is a diagram illustrating an example of data unit reassembly in accordance with one embodiment of the systems and methods described herein.

FIG. 8 is a diagram illustrating an example of data unit reassembly in accordance with one embodiment of the systems and methods described herein. In particular, FIG. 8 follows the example of FIG. 7 wherein three service data units MSDU 1 230, MSDU 2 240, and MSDU 3 260 were split into five fragments 230, 241, 242, 261, and 262. As illustrated in the example of FIG. 8, these five fragments 230, 241, 242, 261, and 262 are reassembled into data unit 330.

Figure 9:
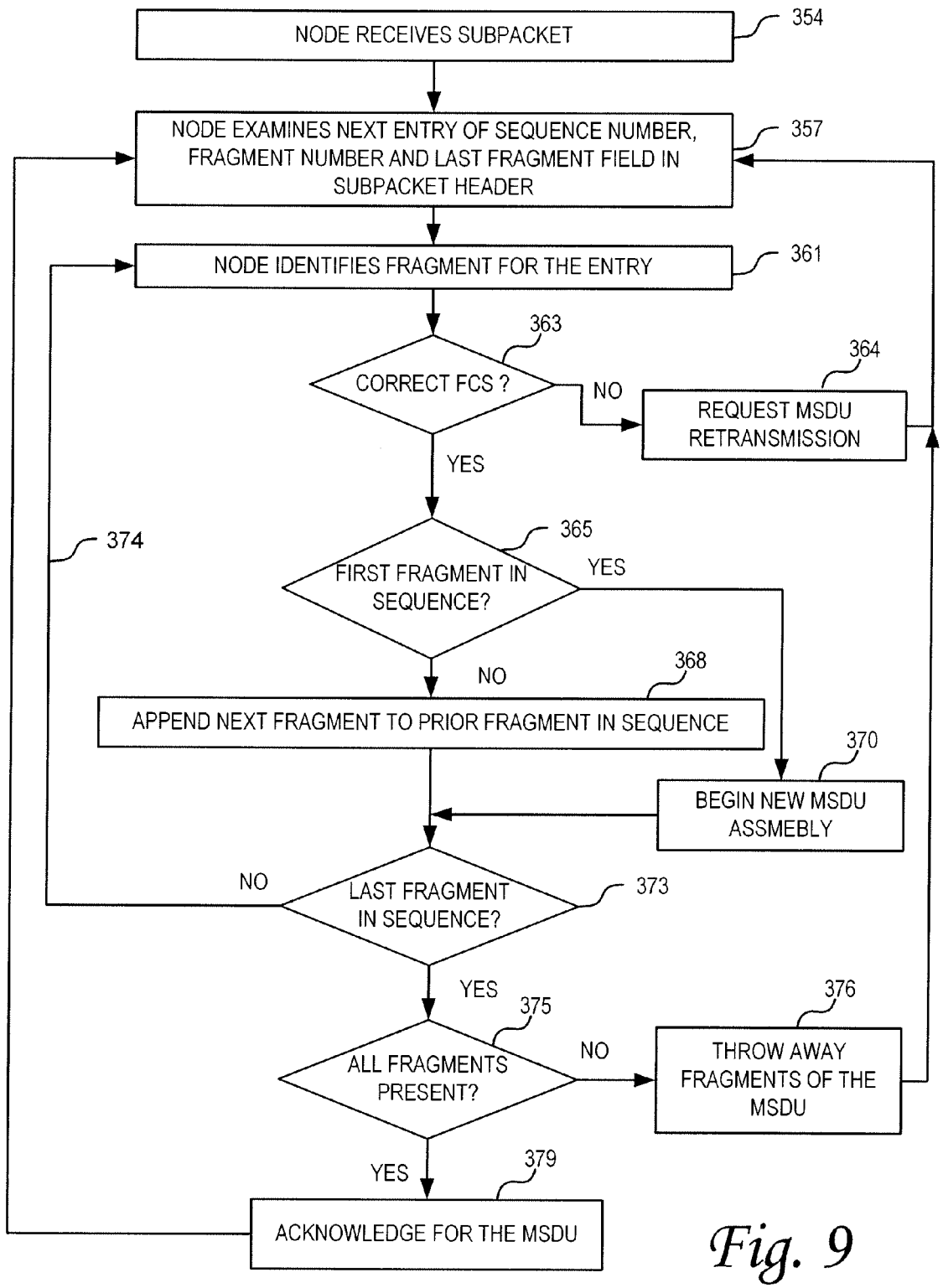
FIG. 9 is a diagram illustrating an example process for repackaging fragmented data in accordance with one embodiment of the systems and methods described herein.

FIG. 9 is a diagram illustrating an example process for repackaging fragmented data in accordance with one embodiment of the systems and methods described herein. Referring now to FIG. 9, at operation 354, the receiving node receives a first subpacket. In one embodiment, a subpacket can be an A_PDU, a MPDU or a sub-MPDU. For example, in terms of the example described above with reference to FIG. 8, the receiving node receives MPDU 331.

At operation 357, the receiving node examines the sequence number, fragment number and last fragment field in the A-PDU subheader 206 to determine whether the A-PDU contains fragments and if so which fragments, and fragments of which flows. Based on information in the A-PDU header 206, the receiving node identifies a first fragment in the A-PDU and determines whether this first fragment is the first in a sequence of fragments in a flow. This is illustrated at operation 361, The FCS is checked to check for errors in the fragment. This is illustrated at operation 363. If the error check is incorrect, the node requests MSDU retransmission at operation 364. If the check indicates the data unit is correct, the node checks to see whether the fragment is the first fragment in the sequence. This is illustrated at operation 365. If the identified fragment is the first fragment in a flow, the receiving node begins a new MSDU assembly. This is illustrated by operation 370.

If at operation 365 the receiving node determines a given fragment is not the first fragment in a flow, it appends this fragment to the prior fragment in the sequence for the MSDU. This is illustrated by operation 368. For example, referring back to the example of FIG. 8, when fragment 2-2 242 is received in sub packet 332, the receiver determines that fragment 2-2 242 is the second fragment in the MSDU, and stores it as such in the buffer. Accordingly, upon reassembly, data units 241 and 242 can be concatenated together as data unit 2 240.

As illustrated by operation 373, this process of identifying fragments, checking their sequence and buffering them continues until the last fragment in the sequence is encountered.

If additional MPDUs (and hence A-PDUs) are received, the process is repeated so that fragments in the A-PDU can be checked, assigned to flows, and buffered. This is illustrated by flow line 374. When the last MPDU is received and buffered, the receiving node checks the fragments for completeness at operation 375. If all the fragments are present, the receiver sends acknowledgment to the transmitting node indicating that the data was successfully received. This is illustrated by operations 379. If, on the other hand, one or more fragments are missing from a flow, the receiving node discards the fragments of the MSDU. This is illustrated by operations 375 and 376.

Figure 10:
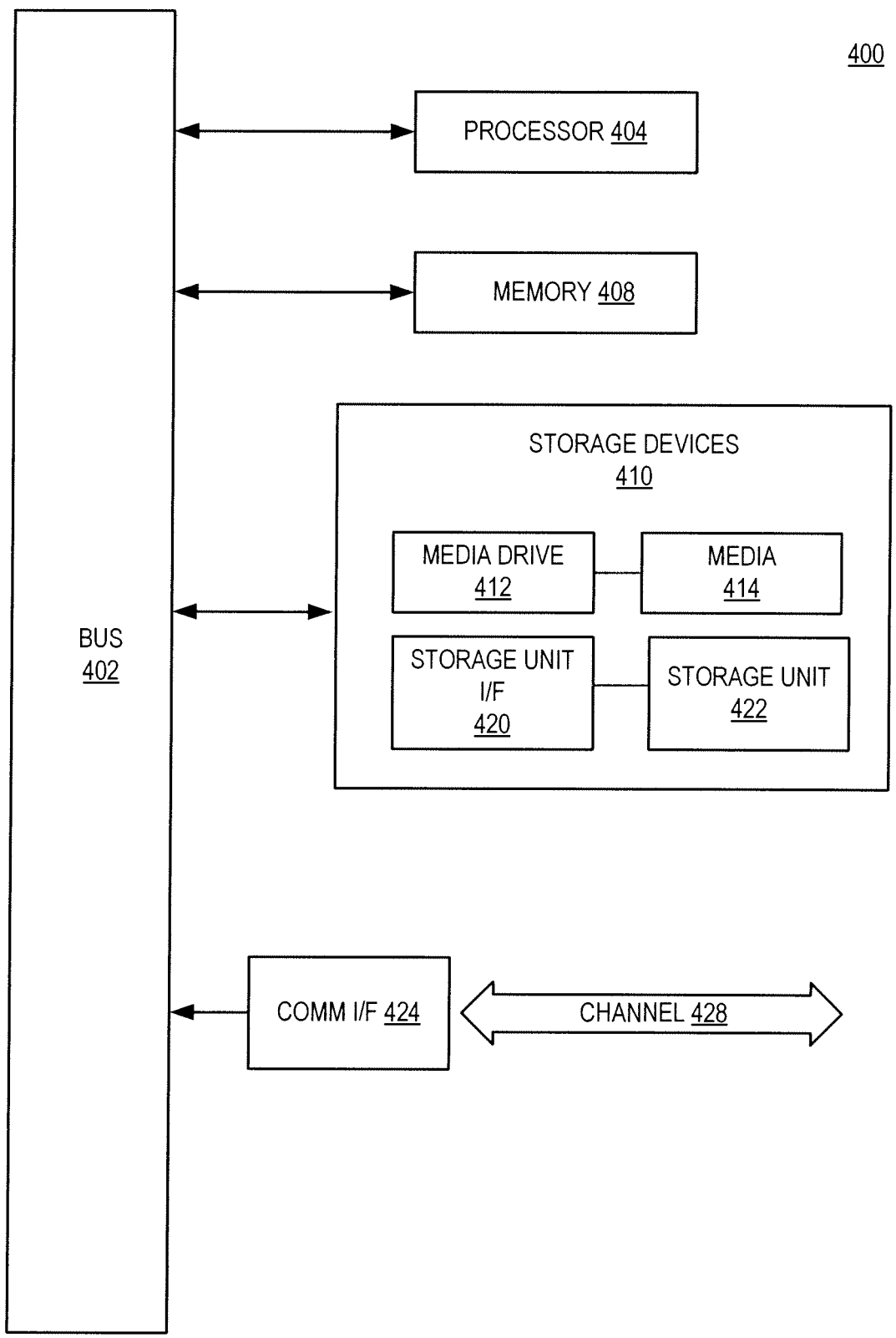
FIG. 10 illustrates an example computing module that may be used in implementing various features of embodiments of the disclosed method and apparatus.

As used herein, the term module might describe a given unit of functionality that can be performed in accordance with one or more embodiments of the disclosed method and apparatus. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the disclosed method and apparatus are implemented in whole or in part using software, in one embodiment, these software elements can be implemented to operate with a computing or processing module capable of carrying out the functionality described with respect thereto. One such example computing module is shown in FIG. 10. Various embodiments are described in terms of this example-computing module 400. After reading this description, it will become apparent to a person skilled in the relevant art how to implement the disclosed method and apparatus using other computing modules or architectures.

Referring now to FIG. 10, computing module 400 may represent, for example, computing or processing capabilities found within desktop, laptop and notebook computers; handheld computing devices (PDA's, smart phones, cell phones, palmtops, etc.); mainframes, supercomputers, workstations or servers; or any other type of special-purpose or general-purpose computing devices as may be desirable or appropriate for a given application or environment. Computing module 400 might also represent computing capabilities embedded within or otherwise available to a given device. For example, a computing module 400 might be found in electronic devices such as, for example, digital cameras, navigation systems, cellular telephones, portable computing devices, modems, routers, wireless access points (WAPs), terminals and other electronic devices that might include some form of processing capability.

Computing module 400 might include, for example, one or more processors, controllers, control modules, or other processing devices, such as a processor 404. Processor 404 might be implemented using a general-purpose or special-purpose processing engine such as, for example, a microprocessor, controller, or other control logic. In the illustrated example, processor 404 is connected to a bus 402, although any communication medium can be used to facilitate interaction with other components of computing module 400 or to communicate externally.

Computing module 400 might also include one or more memory modules, simply referred to herein as main memory 408. For example, preferably random access memory (RAM) or other dynamic memory, might be used for storing information and instructions to be executed by processor 404. Main memory 408 might also be used for storing temporary variables or other intermediate information during execution of instructions to be executed by processor 404. Computing module 400 might likewise include a read only memory ("ROM") or other static storage device coupled to bus 402 for storing static information and instructions for processor 404.

The computing module 400 might also include one or more various forms of information storage mechanism 410, which might include, for example, a media drive 412 and a storage unit interface 420. The media drive 412 might include a drive or other mechanism to support fixed or removable storage media 414. For example, a hard disk drive, a floppy disk drive, a magnetic tape drive, an optical disk drive, a CD or DVD drive (R or RW), or other removable or fixed media drive might be provided. Accordingly, storage media 414 might include, for example, a hard disk, a floppy disk, magnetic tape, cartridge, optical disk, a CD or DVD, or other fixed or removable medium that is read by, written to or accessed by media drive 412. As these examples illustrate, the storage media 414 can include a computer usable storage medium having stored therein computer software or data.

In alternative embodiments, information storage mechanism 410 might include other similar instrumentalities for allowing computer programs or other instructions or data to be loaded into computing module 400. Such instrumentalities might include, for example, a fixed or removable storage unit 422 and an interface 420. Examples of such storage units 422 and interfaces 420 can include a program cartridge and cartridge interface, a removable memory (for example, a flash memory or other removable memory module) and memory slot, a PCMCIA slot and card, and other fixed or removable storage units 422 and interfaces 420 that allow software and data to be transferred from the storage unit 422 to computing module 400.

Computing module 400 might also include a communications interface 424. Communications interface 424 might be used to allow software and data to be transferred between computing module 400 and external devices. Examples of communications interface 424 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 424 might typically be carried on signals, which can be electronic, electromagnetic (which includes optical) or other signals capable of being exchanged by a given communications interface 424. These signals might be provided to communications interface 424 via a channel 428. This channel 428 might carry signals and might be implemented using a wired or wireless communication medium. Some examples of a channel might include a MoCA channel over coaxial cable, phone line, a cellular link, an RF link, an optical link, a network interface, a local or wide area network, and other wired or wireless communications channels.

In this document, the terms "computer program medium" and "computer usable medium" are used to generally refer to physical storage media such as, for example, memory 408, storage unit 420, and media 414. These and other various forms of computer program storage media or computer usable storage media may be involved in storing and providing one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 400 to perform features or functions of the disclosed method and apparatus as discussed herein.

While various embodiments of the disclosed method and apparatus have been described above, it should be understood that they have been presented by way of example only, and not of limitation. Likewise, the various diagrams may depict an example architectural or other configuration for the disclosed method and apparatus, which is done to aid in understanding the features and functionality that can be included in the disclosed method and apparatus. The claimed invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the disclosed method and apparatus. Also, a multitude of different constituent module names other than those depicted herein can be applied to the various partitions. Additionally, with regard to flow diagrams, operational descriptions and method claims, the order in which the blocks are presented herein shall not mandate that various embodiments be implemented to perform the recited functionality in the same order unless the context dictates otherwise.

Although the disclosed method and apparatus is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed method and apparatus, whether or not such embodiments are described and whether or not such features are presented as being a part of a described embodiment. Thus, the breadth and scope of the claimed invention should not be limited by any of the above-described embodiments which are presented as mere examples for illustration only.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

The invention claimed is:

1. A method for fragmenting a protocol data unit for transmission from a source node in a communication network to another node of the network, the method comprising:
   a) the source node determining a quantity of a plurality of subpackets in which to send the protocol data unit, wherein the protocol data unit comprises one or more service data units;
   b) the source node creating a data unit header for a first of the plurality of subpackets;
   c) the source node identifying one or more fragments of the protocol data unit for inclusion in each of the plurality of subpackets;
   d) the source node creating an aggregation subheader for the first of the plurality of subpackets, wherein the aggregation subheader comprises data identifying the one or more fragments; and
   e) the source node concatenating the data unit header, one or more fragments and aggregation subheader to build the first of the plurality of subpackets;
   wherein the one or more fragments in the first of the plurality of subpackets comprise a portion of a service data unit if the source node determines there is not enough bandwidth to transmit the entire service data unit in the first of the plurality of subpackets.

2. The method of claim 1, wherein the aggregation subheader further comprises data identifying a length of each of the one or more fragments.

3. The method of claim 1, further comprising the source node repeating operations b), d), and e) for remaining subpackets of the plurality of subpackets.

4. The method of claim 1, wherein a subpacket of the plurality of subpackets comprises an Media Access Control Protocol Data Unit (MPDU), an aggregate Protocol Data Unit (A_PDU) or a sub-MPDU.

5. The method of claim 1, further comprising the source node computing a checksum for each of the fragments in the first of the plurality of subpackets, and concatenating the checksum for each fragment with its respective fragment in the first of the plurality of subpackets.

6. The method of claim 1, further comprising the source node padding one or more fragments in the first of the plurality of subpackets.

7. The method of claim 1, wherein the protocol data unit is fragmented around transmission requests or reservation requests from another node on the network.

8. The method of claim 7, wherein the protocol data unit is fragmented around a Media Access Plan (MAP).

9. A method for enabling retransmission of protocol data units in a communication network that supports fragmentation of protocol data units, the method comprising:
   a) a network node receiving of a plurality of subpackets, the number of the plurality of subpackets determined by a sending node, wherein each subpacket comprises a packet data unit header, a subpacket header, and one or more fragments of an original protocol data unit, and wherein the one more fragments in each of the plurality of subpackets comprise a portion of a service data unit if the sending node determines there not enough bandwidth to transmit the entire service data unit in each of the plurality of subpackets;
   b) the network node checking flow information for the one or more fragments received in each subpacket and determining whether all fragments of the original protocol data unit have been correctly received from the sending node; and
   c) the network node requesting retransmission of a service data unit of the original protocol data unit if the network node determines that at least one of the one or more fragments are missing from a flow in the original protocol data unit.

10. The method of claim 9, wherein checking flow information for the fragments received comprises checking sequence numbers of the fragments to determine whether each fragment in a sequence of fragments is received correctly.

11. The method of claim 9, wherein checking flow information for the fragments received comprises checking sequence numbers and an Frame Check Sequence (FCS) of the fragments to determine whether each fragment in a sequence of fragments is received correctly.

12. The method of claim 9 further comprising the network node using the flow information to reassemble the plurality of fragments in subpackets into a service data unit.

13. The method of claim 9, wherein flow information comprises a fragment number, a fragment length and a sequence number for the plurality of fragments received.

14. The method of claim 9, wherein the subpacket of the plurality of subpackets comprises an Media Access Control Protocol Data Unit (MPDU), an aggregate Protocol Data Unit (A_PDU) or a sub-MPDU.

15. The method of claim 9, wherein the flow information is packaged into a subheader for each of the plurality of subpackets.

16. A system, comprising:
   a receiver node on a communications network, the receiver node comprising a first processor and a first computer executable program code embodied on a first computer readable medium configured to cause the receiver node to receive communications from a source node in the network;

the source node, comprising a second processor and a second computer executable program code embodied on a second computer readable medium, the second executable program code configured to cause the source node to:

a) determine a quantity of a plurality of subpackets in which to send a protocol data unit to the receiver node, wherein the protocol data unit comprises one or more service data units;

b) create a data unit header for a first of the plurality of subpackets;

c) identify one or more fragments of the protocol data unit for inclusion in each of the plurality of subpackets;

d) create an aggregation subheader for the first of the plurality of subpackets, wherein the aggregation subheader comprises data identifying the one or more fragments; and e) concatenate the data unit header, one or more fragments and aggregation subheader to build the first of the plurality of subpackets;

wherein the one or more fragments in the first of the plurality of subpackets comprise a portion of a service data unit if the source node determines there is not enough bandwidth to transmit the entire service data unit in the first of the plurality of subpackets.

17. The system of claim 16, wherein the aggregation subheader further comprises data identifying a length of each of the one or more fragments.

18. The system of claim 16, wherein the second executable program code is further configured to cause the source node to repeat operations b), d), and e) for remaining subpackets of the plurality of subpackets.

19. The system of claim 16, wherein the second executable program code is further configured to cause the source node to compute a checksum for each of the fragments in the first of the plurality of subpackets, and concatenate the checksum for each fragment with its respective fragment in the first of the plurality of subpackets.

20. The system of claim 16, wherein the second executable program code is further configured to cause the source node to pad one or more fragments in the first of the plurality of subpackets.

21. The system of claim 16, wherein the second executable program code is further configured to cause the source node to fragment the protocol data unit around transmission requests or reservation requests from another node on the network.

22. The system of claim 21, wherein the protocol data unit is fragmented around a Media Access Plan (MAP).

23. A system, comprising:

a source node on a communications network, the source node comprising a first processor and a first computer executable program code embodied on a first computer readable medium configured to cause the source node to send communications to a receiver node in the network;

the receiver node, comprising a second processor and a second computer executable program code embodied on a second computer readable medium, the second executable program code configured to cause the receiver node to:

a) receive a plurality of subpackets, the plurality of subpackets in which a protocol data unit is sent being determined by the source node, wherein each subpacket comprises a packet data unit header, a subpacket header, and one or more fragments of one or more service data units, wherein the one or more fragments in each of the plurality of subpackets comprise a portion of a service data unit if the source node determines there is not enough bandwidth to transmit the entire service data unit in each of the plurality of subpackets;

b) check flow information for the one or more fragments received in each subpacket and determine whether all fragments in the original protocol data unit have been received in their entirety from the source node; and c) request retransmission of the protocol data unit if the receiver node determines that at least one of the one or more fragments is missing from a flow in the protocol data unit.

24. The system of claim 23, wherein the operation of checking flow information for the fragments received comprises checking sequence numbers and an Frame Check Sequence (FCS) fragments determine whether each fragment n a sequence of fragments is received.

25. The system of claim 23, wherein the operation of checking flow information for the fragments received comprises checking sequence numbers of the fragments to determine whether each fragment in a sequence of fragments is received.

26. The system of claim 23, wherein the second executable program code is further configured to cause the receiver node to use the flow information to reassemble a plurality of fragments in subpackets into a service data unit.

27. The system of claim 23, wherein flow information comprises a fragment number, a fragment length and a sequence number for the plurality of fragments received.

28. The system of claim 23, wherein the flow information is packaged into a subheader for each of the plurality of subpackets.

* * * * *